(12) United States Patent
Lin

(10) Patent No.: US 7,792,221 B2
(45) Date of Patent: Sep. 7, 2010

(54) FLEXIBLE DIVERSITY COMBINE RECEIVER ARCHITECTURE FOR DIGITAL TELEVISION

(75) Inventor: Che-Li Lin, Taipei (TW)

(73) Assignee: MediaTek Inc., Science-Based Industrial Park, Hsin-Chu Hsien (JP)

( * ) Notice: Subject to any disclaimer, the term of this patent is extended or adjusted under 35 U.S.C. 154(b) by 1274 days.

(21) Appl. No.: 11/306,865

(22) Filed: Jan. 13, 2006

(65) Prior Publication Data
US 2007/0165142 A1    Jul. 19, 2007

(51) Int. Cl.
*H03D 1/00* (2006.01)
(52) U.S. Cl. .................. 375/340; 375/347; 375/350; 375/260; 375/355; 725/131; 725/139; 725/100; 348/726; 348/731
(58) Field of Classification Search ............ 375/347, 375/350, 355, 340, 260; 725/131, 139, 100; 348/726, 731
See application file for complete search history.

(56) References Cited

U.S. PATENT DOCUMENTS 6,108,389 A * 8/2000 Morariu et al. ............ 375/355
2002/0150185 A1 10/2002 Meehan et al.
2009/0097593 A1 * 4/2009 Hamaminato et al. ....... 375/340
2009/0207927 A1 * 8/2009 Watanabe et al. ........... 375/260

FOREIGN PATENT DOCUMENTS

EP    1331782 A2    7/2003
WO    WO03069802 A1    8/2003

* cited by examiner

*Primary Examiner*—Eva Y Puente
(74) *Attorney, Agent, or Firm*—Winston Hsu

(57) ABSTRACT

A method of generating a smoothed transport stream to an MPEG decoder for a diversity combine digital television receiver includes generating a plurality of synchronization clocks and demodulated signals according to a plurality of digital television signals received from a plurality of antennas; monitoring a signal quality associated with each of the digital television signals; combining at least demodulated signals having a signal quality being greater than a predetermined threshold to thereby form a combined signal; generating transport stream packets according to the combined signal; selecting a synchronization signal corresponding to a digital television signal having a signal quality being greater than a second predetermined threshold as a selected synchronization signal; and generating a smoothed transport stream having packets being uniformly spaced according to the transport stream packets and the selected synchronization signal.

20 Claims, 14 Drawing Sheets

FLEXIBLE DIVERSITY COMBINE RECEIVER ARCHITECTURE FOR DIGITAL TELEVISION

BACKGROUND

The invention relates to digital television, and more particularly, to improving received signal quality when using multiple antennas in a diversity combine receiver.

A diversity combine architecture is often utilized when receiving digital television signals. The term diversity combine refers to employing a plurality of antennas being separated from each other to increase the chances of receiving a high quality signal. For example, diversity combine architectures are often utilized in automobile based television receivers. By using more than one antenna, the likelihood of at least one of the antennas receiving a higher quality signal is increased.

FIG. 1 shows a conventional diversity combine architecture 100 according to the related art. As shown in FIG. 1, the conventional diversity combine architecture 100 includes a master receiver 102 being coupled to a first antenna 101, and a slave receiver 104 being coupled to a second antenna 103. The master receiver 102 and the slave receiver 104 are typically each implemented by an integrated circuit (IC), where a video decoder such as an MPEG decoder 106 is coupled to the master receiver 102 but not the slave receiver 104. In this way, the actual number of antennas 101, 103 can be easily scaled to any number. That is, adding another antenna to the architecture simply involves adding another slave receiver IC being connected in the same manner to the first slave receiver 104.

In FIG. 1, the slave receiver 104 utilizes the demodulator 116 to demodulate a received signal and to correlate with channel state information (e.g., representative signal quality or reliability information). The received signal and channel state information is passed to the signal combine unit 110 of the master receiver 102 where further channel decoding and smooth buffer operations are performed. The goal of the smooth buffer 114 is to ensure that transport stream (TS) packets decoded from the received signal are passed to the MPEG decoder 106 at a uniform rate. By passing TS packets to the MPEG decoder 106 at a uniform rate, the MPEG decoder 106 is able to make a 27 MHz PLL in a subsequent stage lock at a very stable reference frequency according to the regular incrementing of the program clock reference (PCR). Having a stable reference frequency helps assure high quality overall picture frame quality. Should the smooth buffer be unable to pass TS packets to the MPEG decoder at a uniform rate, the 27 MHz PLL will not have a stable frequency and the resulting overall picture frame quality will suffer.

FIG. 2 shows degraded received signal quality and a resulting degraded synchronization clock reference signal of the master receiver 102 of FIG. 1. To perform the above described TS packet smoothing operation, the smooth buffer 114 requires that the demodulator 108 provides an accurate synchronization clock reference signal to allow the smooth buffer 114 to determine the uniform rate at which to pass packets to the MPEG decoder 106. However, in some situations the signal quality of the master receiver 102 will be very poor. For example, a poor signal quality of the master receiver 102 could be caused by a malfunction with the first antenna 101 or if an object blocks the signal reception of the first antenna 101 as shown in FIG. 2. In this type of situation, the demodulator 108 of the master receiver 102 will be unable to provide an accurate synchronization clock reference to the smooth buffer 114. The smooth buffer 114 will therefore be unable to operate normally. As previously mentioned, this will have a negative impact on overall picture frame quality. For example, the smooth buffer 114 may encounter a buffer overflow because of an improper rate of packets being passed from the smooth buffer 114 to the MPEG decoder 106. Buffer overflow will result in packet loss, which has a very serious negative effect on MPEG video decoding operations. An improved diversity receiver architecture that avoids this problem would be beneficial.

SUMMARY OF THE INVENTION

One objective of the claimed invention is therefore to provide a method for generating a smoothed transport stream to an MPEG decoder for a diversity combine digital television receiver, to solve the above-mentioned problem.

According to an exemplary embodiment of the claimed invention, a digital television receiver is disclosed comprising a demodulator being coupled to an antenna for generating a synchronization clock and a demodulated signal according to a digital television signal received from the antenna; a first switch having one end being coupled to a bypass signal from another receiver for selectively coupling the bypass signal to a first node or a second node; a signal combiner being coupled to the demodulator and the first node for combining the demodulated signal and the bypass signal when the first switch is coupling the bypass signal to the first node, and for passing the demodulated signal when the first switch is not coupling the bypass signal to the first node to thereby form a combined signal; a channel decoder being coupled to the signal combiner for generating transport stream packets according to the combined signal; a smooth buffer being coupled to the channel decoder and the demodulator for generating a smoothed transport stream having packets being uniformly spaced according to the transport stream packets generated by the channel decoder and the synchronization signal generated by the demodulator; and a second switch being coupled to the signal combiner, the smooth buffer, and the first switch for selectively coupling the combined signal, the smoothed transport stream, or the bypass signal to an output terminal of the digital television receiver.

According to another exemplary embodiment of the claimed invention, a digital television receiver is disclosed comprising a demodulator being coupled to an antenna for generating a synchronization clock and a demodulated signal according to a digital television signal received from the antenna; a first switch for selectively coupling the synchronization clock being generated by the demodulator or a bypass synchronization clock from another receiver to a first node; a signal combiner being coupled to the demodulator and an output signal from the other receiver for combining the demodulated signal and the output signal from the other receiver to the first node to thereby form a combined signal; a channel decoder being coupled to the signal combiner for generating transport stream packets according to the combined signal; a smooth buffer being coupled to the channel decoder and the first node for generating a smoothed transport stream having packets being uniformly spaced according to the transport stream packets generated by the channel decoder and the selected synchronization signal; and a second switch being coupled to the signal combiner and the smooth buffer for selectively coupling the combined signal or the smoothed transport stream to an output terminal of the digital television receiver.

According to another exemplary embodiment of the claimed invention, a method is disclosed for generating a smoothed transport stream to an MPEG decoder for a diversity combine digital television receiver including generating a plurality of synchronization clocks and demodulated signals according to a plurality of digital television signals received from a plurality of antennas; monitoring a signal quality associated with each of the digital television signals; combining at least demodulated signals having a signal quality being greater than a predetermined threshold to thereby form a combined signal; generating transport stream packets according to the combined signal; selecting a synchronization signal corresponding to a digital television signal having a signal quality being greater than a second predetermined threshold as a selected synchronization signal; and generating a smoothed transport stream having packets being uniformly spaced according to the transport stream packets and the selected synchronization signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
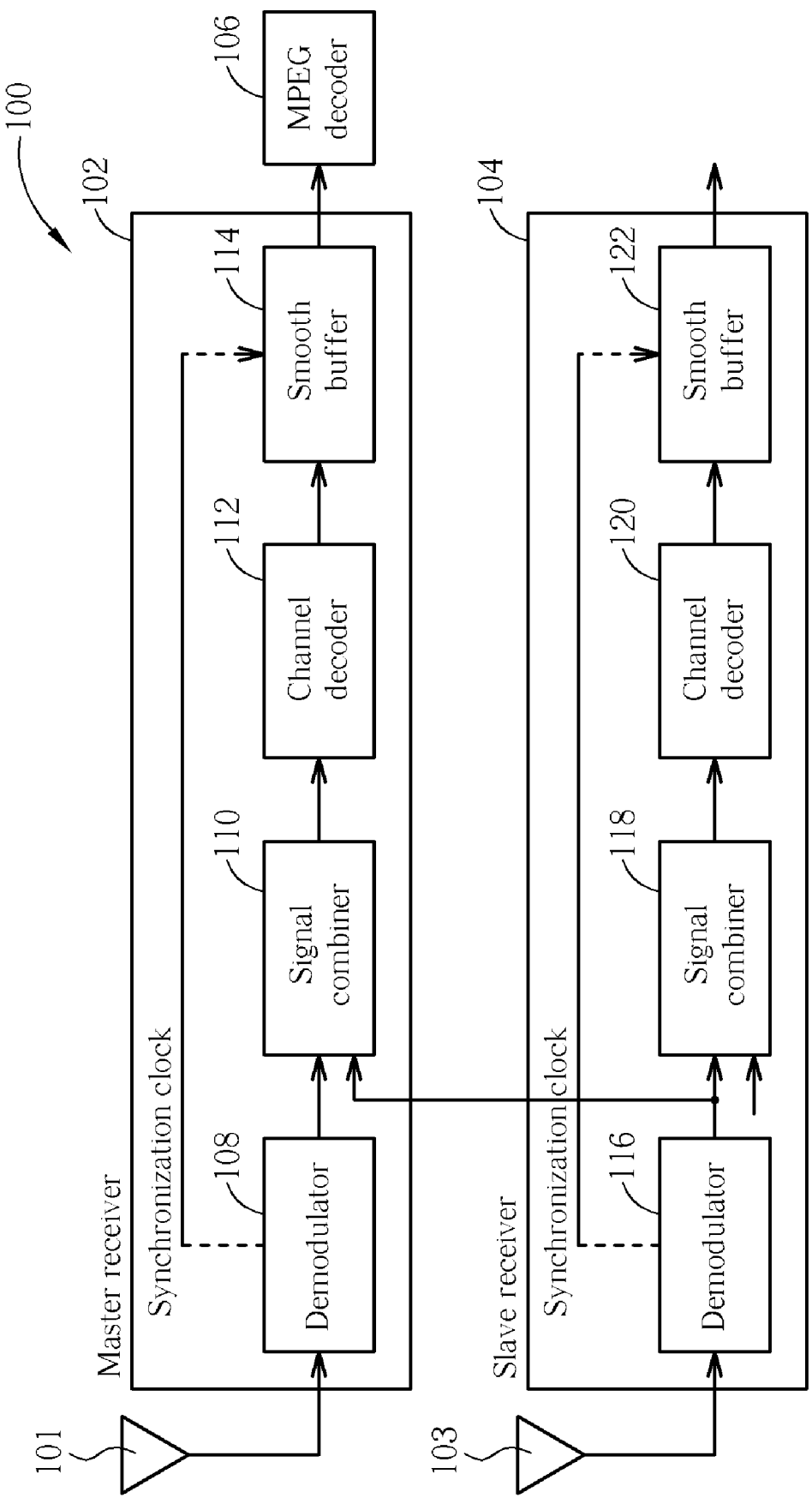
FIG. 1 shows a conventional diversity combine architecture according to the related art.
Figure 2:
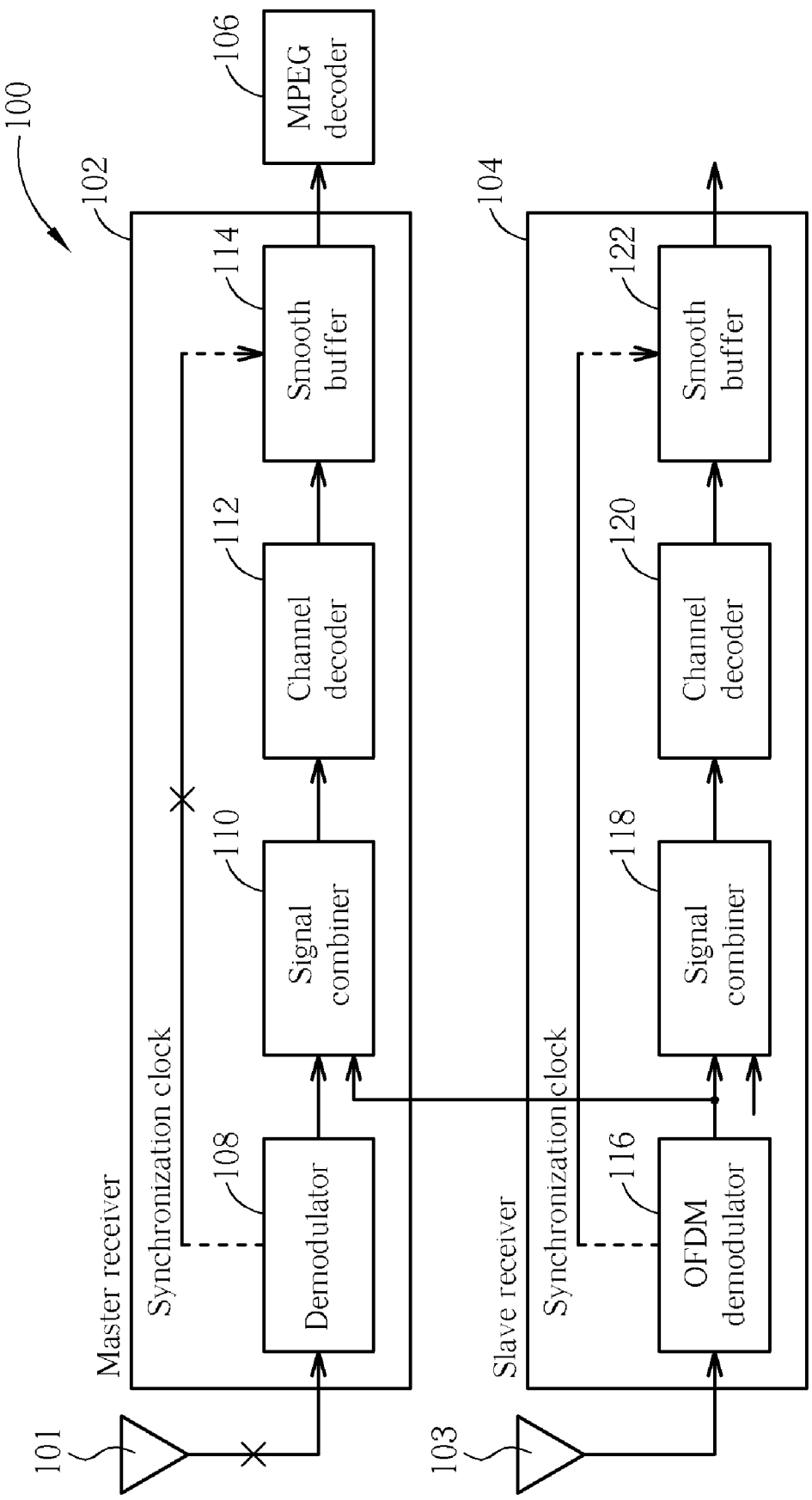
FIG. 2 shows degraded received signal quality and a resulting degraded synchronization clock reference signal of the master receiver of FIG. 1.
Figure 3:
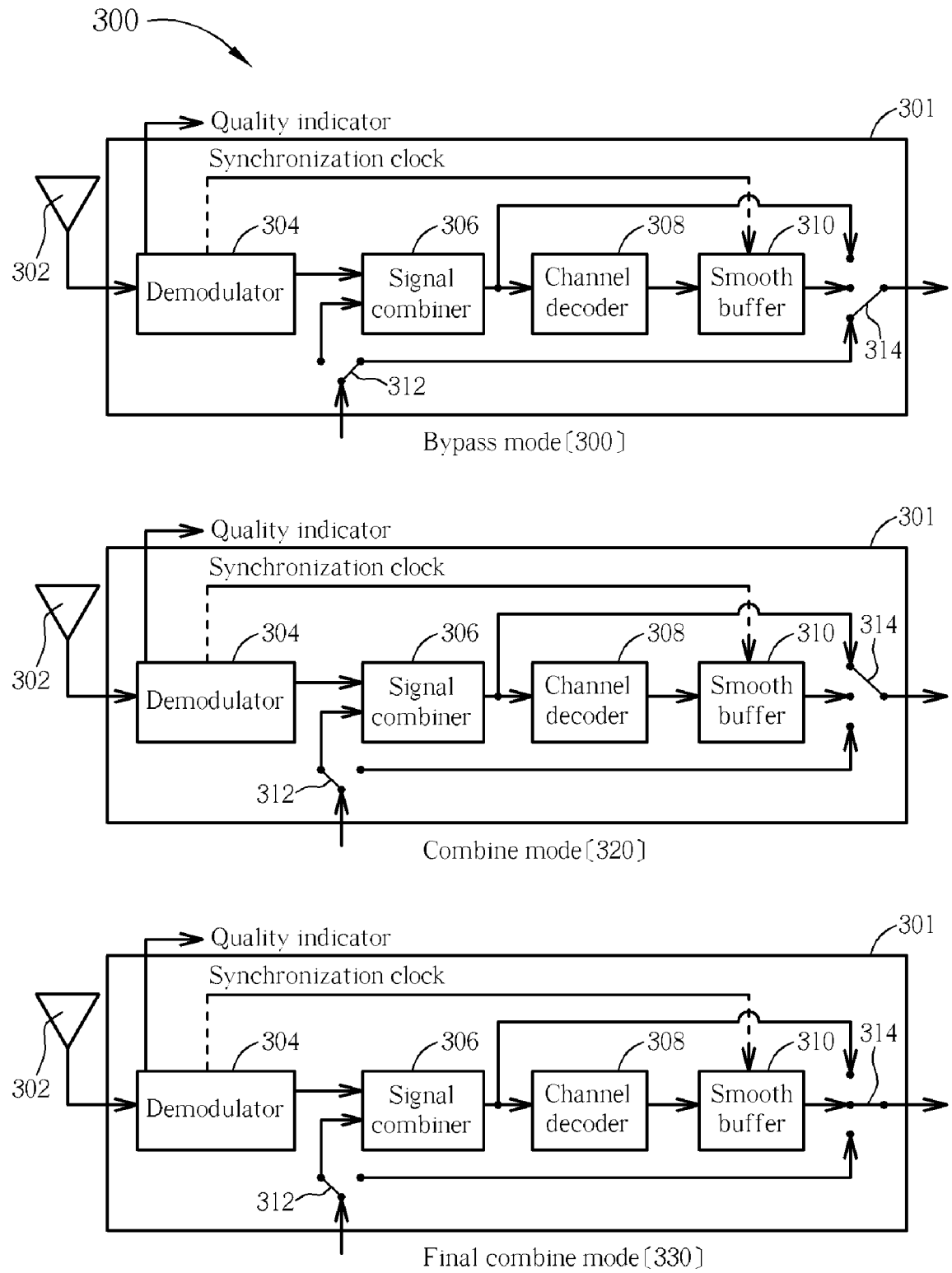
FIG. 3 shows three possible modes of a receiver unit for use in a diversity combine receiver according to a first exemplary embodiment of the present invention.

FIG. 3 shows three possible modes 300, 320, 330 of a receiver unit 301 for use in a diversity combine receiver according to a first exemplary embodiment of the present invention. As shown in FIG. 3, in this embodiment, each receiver unit 301 in the diversity combine receiver includes functional blocks such as a demodulator 304, a signal combiner 306, a channel decoder 308, a smooth buffer 310, a first switch 312, and a second switch 314 and is capable of the following three modes:

Bypass Mode [labeled 300 in FIG. 3]
Combine Mode [labeled 320 in FIG. 3]
Final Combine Mode [labeled 330 in FIG. 3]

Bypass mode 300 is utilized when the signal received from the antenna 302 is of very poor quality and is not sufficient to provide an effective signal to increase the overall received signal quality of the diversity combine receiver. In this case, the signal received from the antenna 302 of the receiver unit 301 is of no use and therefore switches 312 and 314 simply pass the received signal from previous receiver(s) onward as the output of the current receiver unit 301.

Combine mode 320 is utilized when the signal received from the antenna 302 is of sufficient quality such that it is possible to effectively increase the overall received signal quality of the diversity combine receiver. In combine mode 320, switch 312 and switch 314 are positioned so that the receiver 301 combines its own received signal decoded by the demodulator 304 with the received signal from a previous receiver. The resulting combination is then passed to a next receiver for further processing.

Final combine mode 330 is utilized when the receiver 301 is the closest receiver to the master receiver in the diversity combine receiver (or is the master receiver) and is also receiving a signal from the antenna 302 of sufficient quality such that it is possible to effectively increase the overall received signal quality of the diversity combine receiver. In final combine mode 330, switches 312 and 314 are positioned so that the receiver 301 utilizes all functional blocks 304, 306, 308, and 310 to thereby combine its own received signal decoded by the demodulator 304 with the received signal from a previous receiver. Additionally, channel decoding and smooth buffering operations are also performed at the channel decoder 308 and smooth buffer 310, respectively. Because the received signal quality of the receiver in final combine mode 330 is of sufficient quality (i.e., the signal quality of the receiver 301 must be good or the receiver 301 will not be switched to final combine mode 330), the demodulator 304 is capable of providing a high quality and accurate synchronization clock reference signal to the smooth buffer 310. In this way, the smooth buffer 310 will not have a buffer overflow and the transport stream (TS) packet output rate will be uniform.

Figure 4:
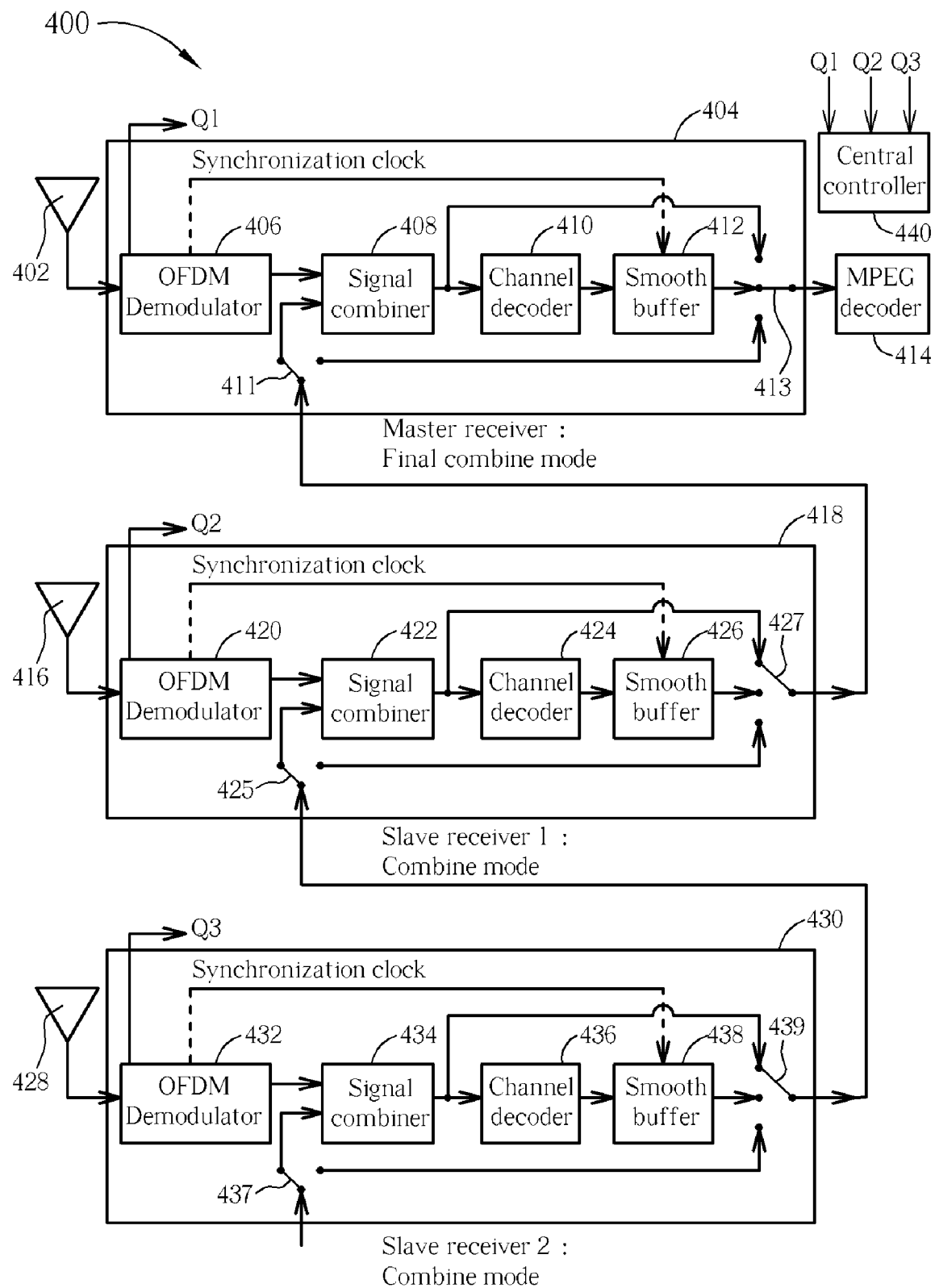
FIG. 4 shows a diversity combine receiver having three receiver units capable of the modes shown in FIG. 3 when all three receiver units are receiving good signal quality according to an exemplary embodiment of the present invention.

FIG. 4 shows a first diversity combine receiver 400 having three receiver units 404, 418, 439 each capable of the three modes shown in FIG. 3 where all three receiver units are receiving good signal quality according to an exemplary embodiment of the present invention. It should be noted that three receivers 404, 418, 439 is shown as an example only, and as will be apparent to a person of ordinary skill in the art after reading the following description, other numbers of receivers can also easily be implemented according to the present invention. For example, by coupling a plurality of digital television receivers in serial with each digital television receiver for processing a unique digital television signal and a last digital television being a master receiver connected to the MPEG decoder, the signals from any number of antennas can be effectively combined according to the present invention. As shown in FIG. 4, receiver unit 404 is the master receiver unit being coupled to an MPEG decoder 414. Additionally, the diversity combine receiver 400 also includes a central controller 440 for switching the mode of each of the receivers 404, 418, 430 in the diversity combine receiver 400.

Figure 5:
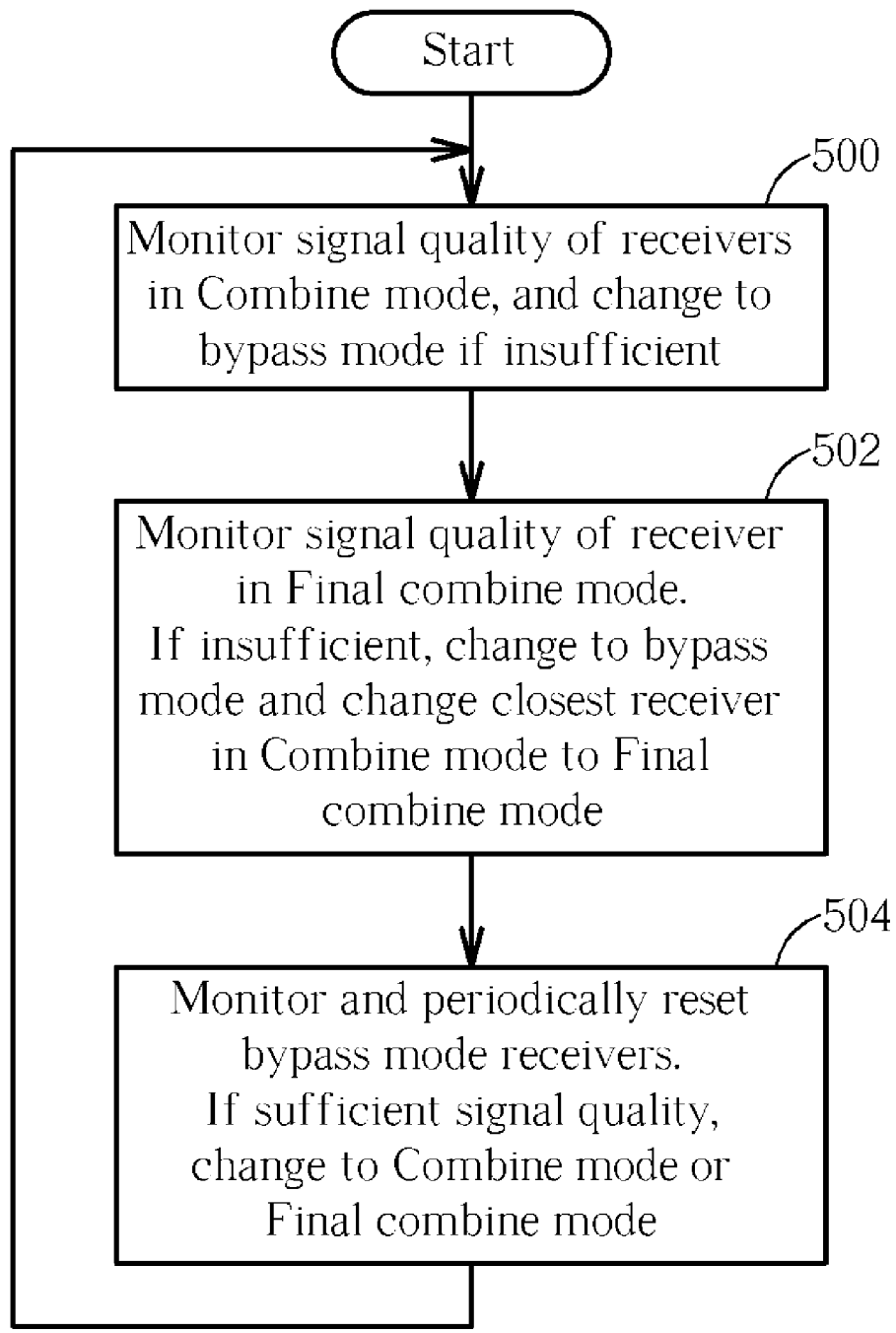
FIG. 5 shows a flowchart describing the operation of the central controller according to an exemplary embodiment of the present invention.

FIG. 5 shows a flowchart describing the operation of the central controller 440 according to an exemplary embodiment of the present invention. Provided that substantially the same result is achieved, the steps of the flowchart in FIG. 5 need not be in the exact order shown and need not be contiguous, that is, other steps can be intermediate. In FIG. 5, setting the mode of each of the receiver 404, 418, 430 is performed according to a signal quality indicator Q1, Q2, Q3 outputted by each of the receivers 404, 418, 430, respectfully and includes the following steps:

Step 500: Monitor the signal quality Q1, Q2, or Q3 of the receivers in Combine mode. If any of these receivers does not have sufficient quality, put the receiver into bypass mode.

Step 502: Monitor the signal quality of the receiver in Final combine mode. If this receiver does not have sufficient quality, put the receiver into bypass mode and change the receiver which is closest to it and is operated in combine mode to Final combine mode.

Step 504: Monitor and periodically reset the bypass mode receivers. If any of these receivers has sufficient signal quality, put them into Combine mode or Final combine mode. In order to determine whether to use Combine mode or Final combine mode, note the following rule: There is only ever one receiver operated in final Combine mode. That is, the combine mode receiver that is located closest to the master receiver is operated in Final combine mode.

Referring back to FIG. 4, because the receiver unit 404 is closest to the master receiver (i.e., receiver unit 404 is actually the master receiver being coupled to the MPEG decoder 414) and because receiver unit 404 has good signal quality, receiver unit 404 is operated in Final combine mode. Both the other slave receivers 418, 430 are operated in Combine mode because they are each receiving sufficient signal quality that they can therefore help increase the overall signal quality of the diversity combine receiver 400.

Figure 6:
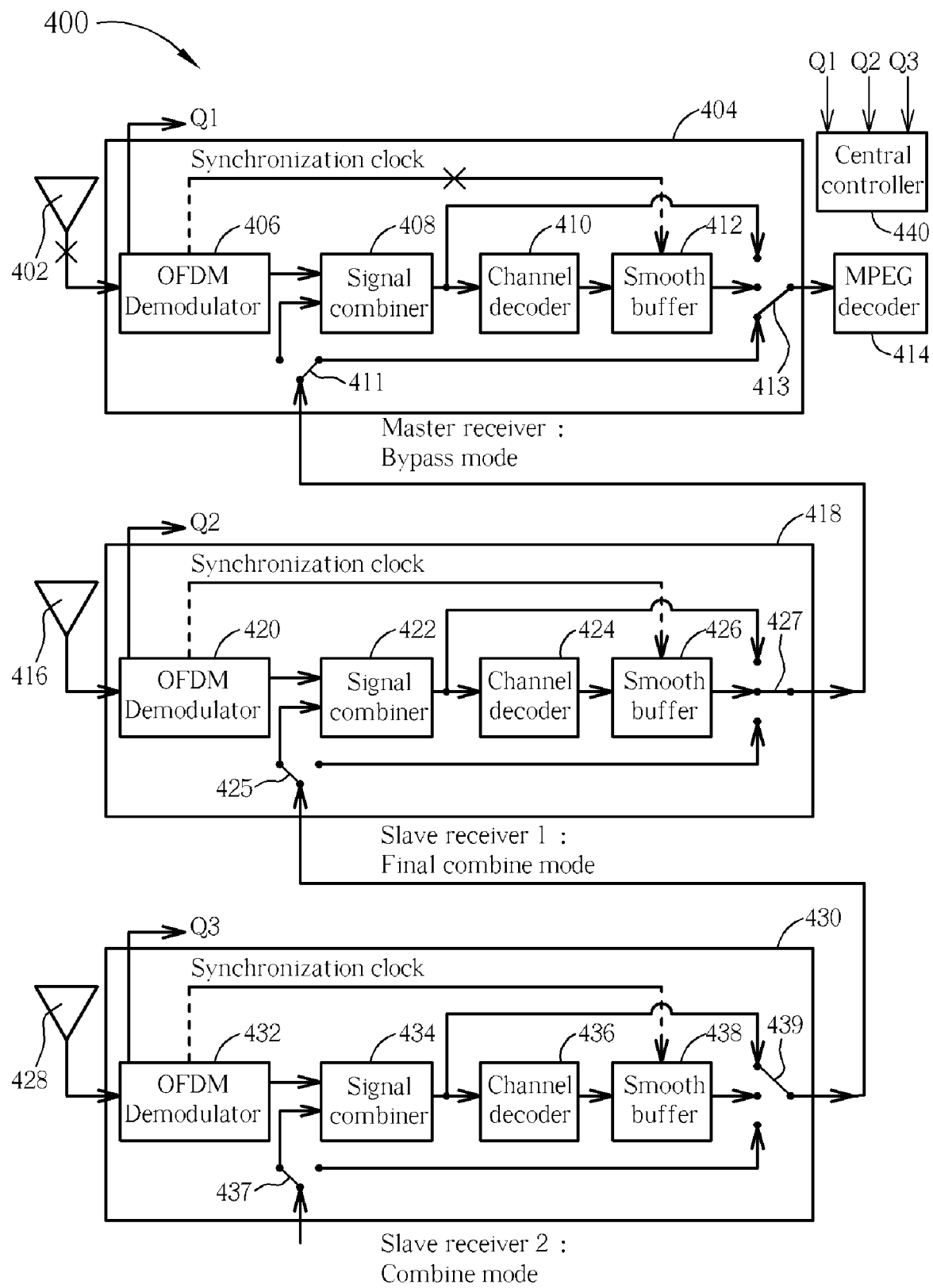
FIG. 6 shows the diversity combine receiver of FIG. 4 when the master receiver has poor signal quality while the two slave receivers both have good signal quality.
Figure 7:
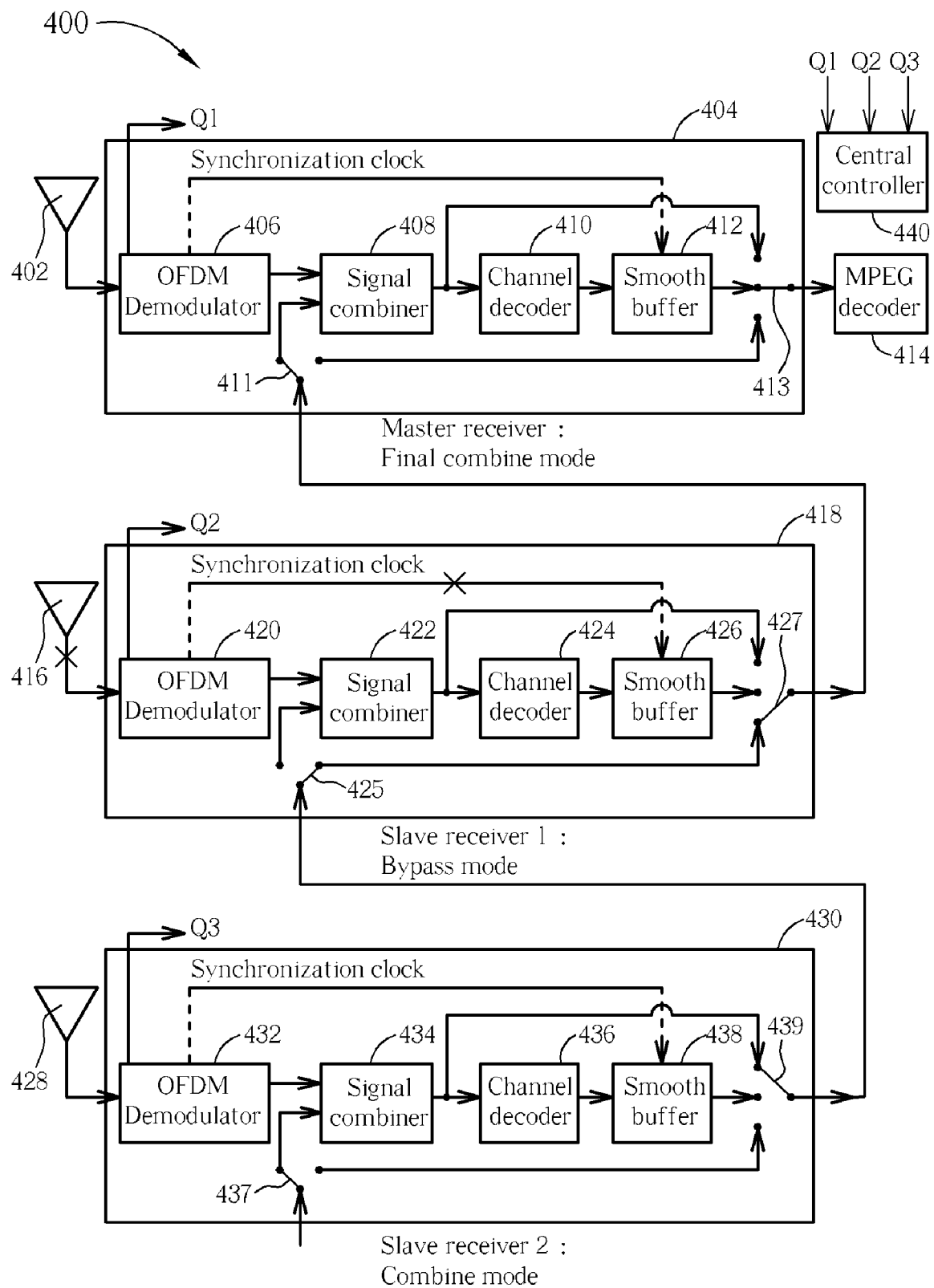
FIG. 7 shows the diversity combine receiver of FIG. 4 when the master receiver has good signal quality, the first slave receiver has poor signal quality, and the second slave receiver has good signal quality.
Figure 8:
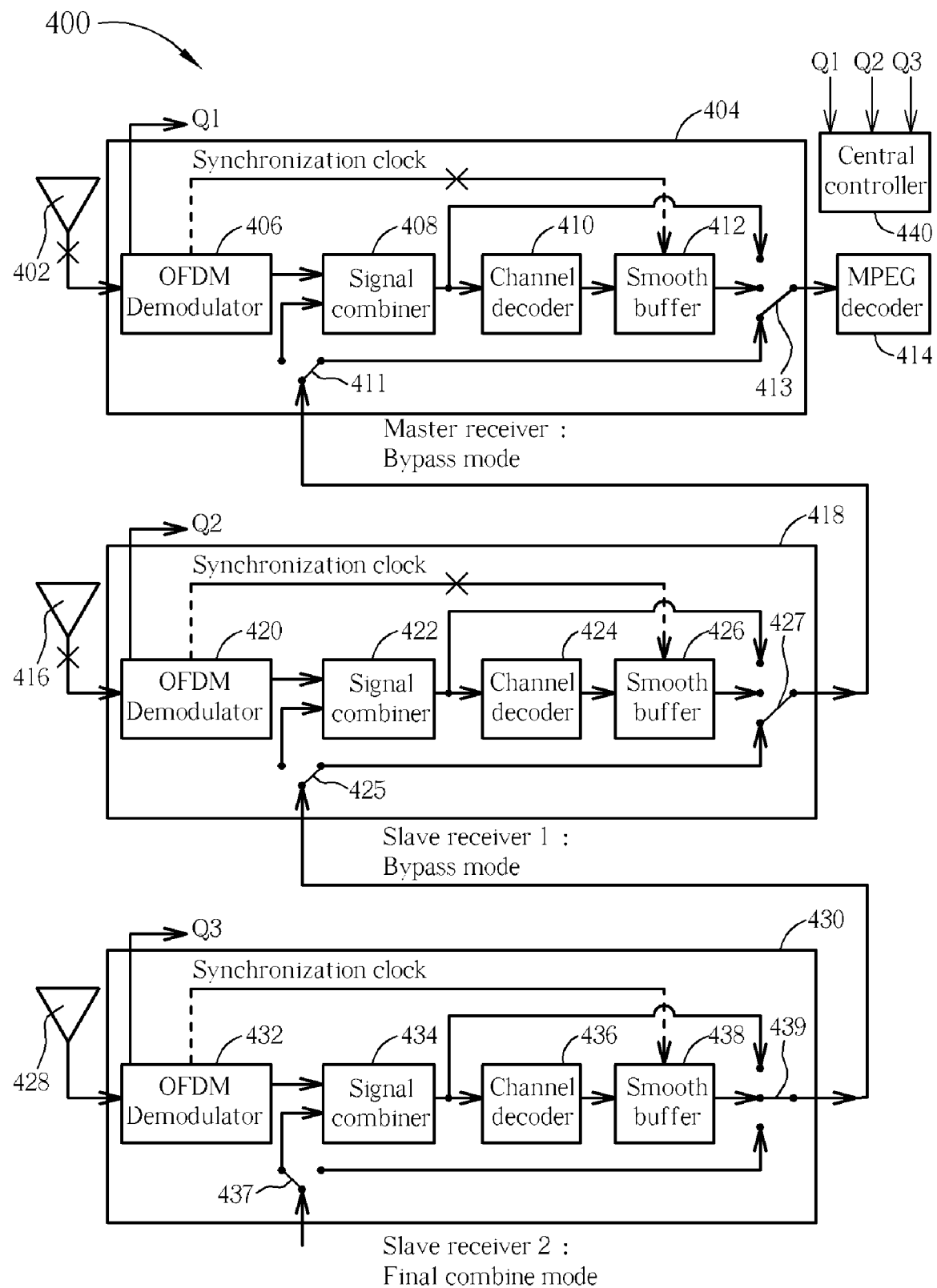
FIG. 8 shows the diversity combine receiver of FIG. 4 when the master receiver has poor signal quality, the first slave receiver has poor signal quality, and the second slave receiver has good signal quality.

FIG. 6 to FIG. 8 show additional examples of the first diversity combine receiver 400 according to the present invention when the three receiver units 404, 418, 430 are receiving various signal qualities. In particular, FIG. 6 shows the first diversity combine receiver 400 when the master receiver 404 has poor signal quality while the two slave receivers 418, 430 both have good signal quality. In this situation, according to the algorithm of FIG. 5, the central controller 440 switches the master receiver 404 into Bypass mode, the first slave receiver 418 into Final combine mode, and the second slave receiver 430 into Combine mode. FIG. 7 shows the first diversity combine receiver 400 when the master receiver 404 has good signal quality, the first slave receiver 418 has poor signal quality, and the second slave receiver 430 has good signal quality. In this situation, according to the algorithm of FIG. 5, the central controller 440 switches the master receiver 404 into Final combine mode, the first slave receiver 418 into Bypass mode, and the second slave receiver 430 into Combine mode. FIG. 8 shows the first diversity combine receiver 400 when the master receiver 404 has poor signal quality, the first slave receiver 418 has poor signal quality, and the second slave receiver 430 has good signal quality. In this situation, according to the algorithm of FIG. 5, the central controller 440 switches the master receiver 404 into Bypass mode, the first slave receiver 418 into Bypass mode, and the second slave receiver 430 into Final combine mode.

Figure 9:
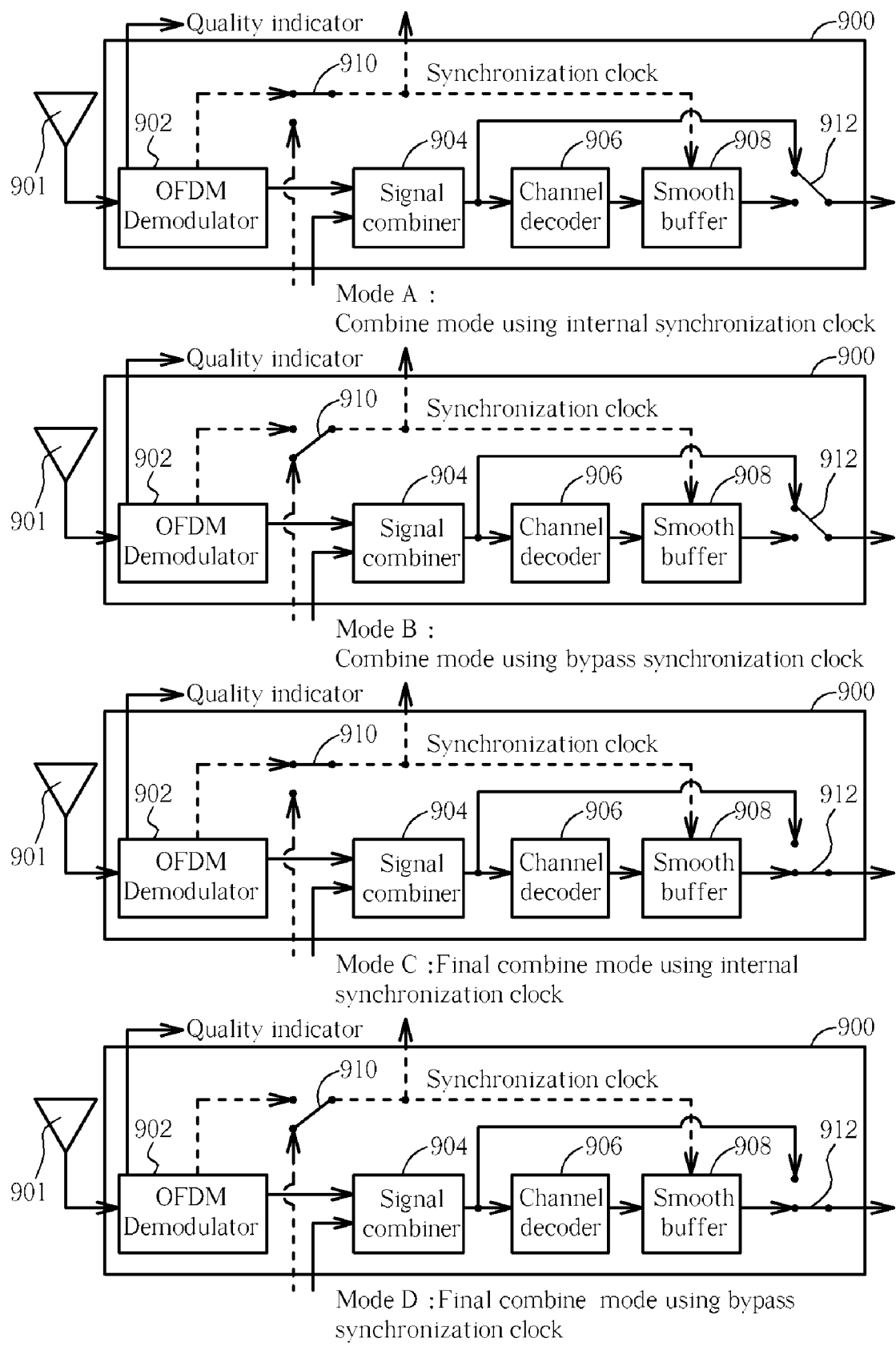
FIG. 9 shows four possible modes of a receiver unit for use in a diversity combine receiver according to a second exemplary embodiment of the present invention.

FIG. 9 shows four possible modes of a receiver unit 900 for use in a diversity combine receiver according to a second exemplary embodiment of the present invention. As shown in FIG. 9, in this embodiment, each receiver unit 900 in the diversity combine receiver includes functional blocks such as a demodulator 902, a signal combiner 904, a channel decoder 906, a smooth buffer 908, a first switch 910, and a second switch 912, and is capable of the following four modes:

Mode A: Combine mode using internal synchronization clock. Mode A is used to pass the combination of the signal received by the antenna 901 and received from a previous receiver to a next receiver, and to pass the synchronization clock decoded by the demodulator 902 to the next receiver.

Mode B: Combine mode using bypass synchronization clock. Mode B is used to pass the combination of the signal received by the antenna 901 and received from a previous receiver to a next receiver, and to directly pass the synchronization clock received from the previous receiver to the next receiver.

Mode C: Final combine mode using internal synchronization clock. Mode C is used to combine the signal received by the antenna 901 and received from a previous receiver, and to then perform the channel decoding and smooth buffering functions on the result. In this mode, the smooth buffer 908 utilizes the synchronization clock outputted by the demodulator of the current receiver unit 900.

Mode D: Final combine mode using bypass synchronization clock. Mode D is used to combine the signal received by the antenna 901 and received from a previous receiver, and to then perform the channel decoding and smooth buffering functions on the result. In this mode, the smooth buffer 908 utilizes a synchronization clock received from the previous receiver.

Figure 10:
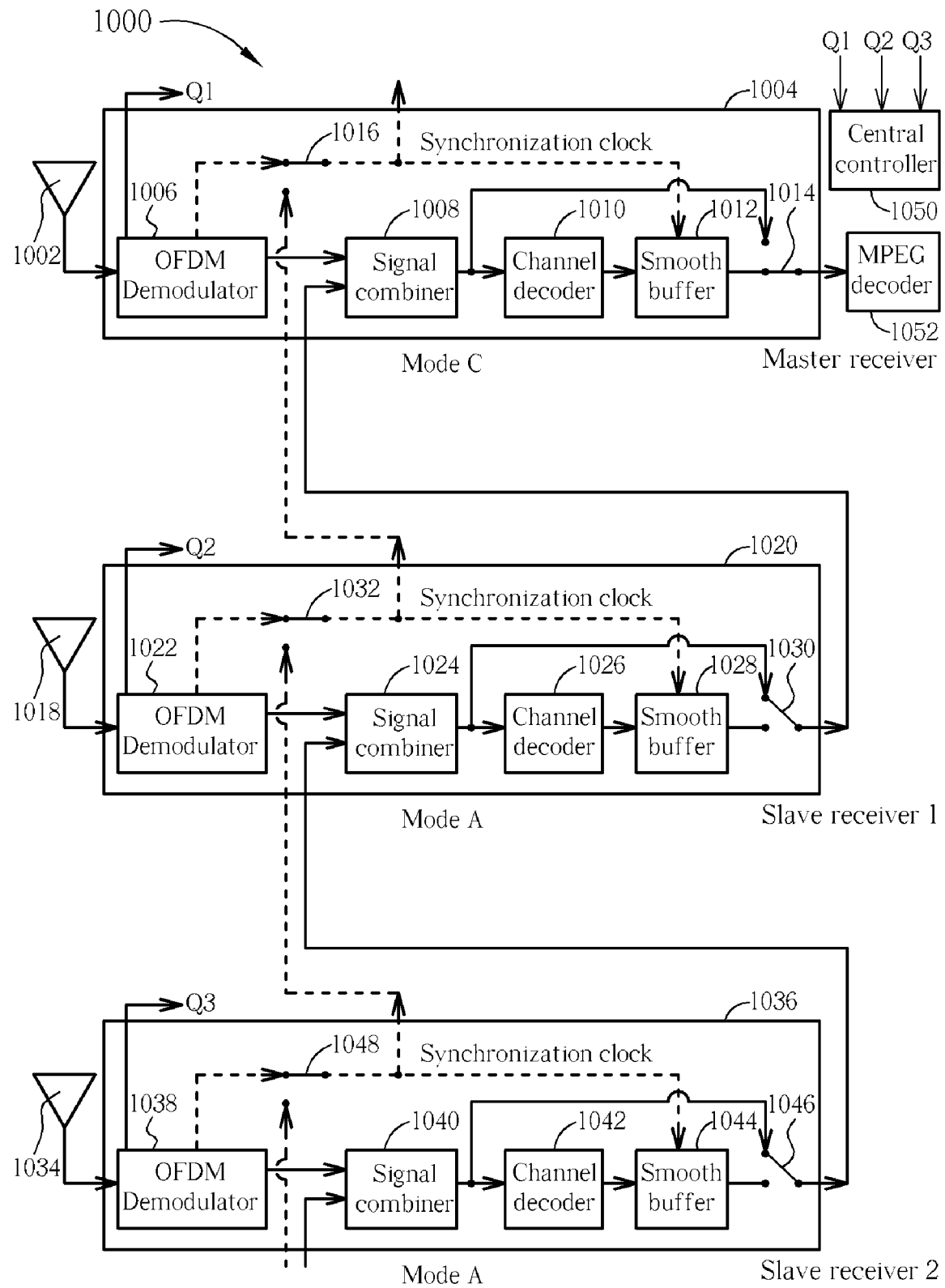
FIG. 10 shows a diversity combine receiver having three receiver units each capable of the four modes shown in FIG. 9 where all three receiver units are receiving good signal quality according to an exemplary embodiment of the present invention.

FIG. 10 shows a first diversity combine receiver 1000 having three receiver units 1004, 1020, 1036 each capable of the four modes shown in FIG. 9 where all three receiver units 1004, 1020, 1036 are receiving good signal quality according to an exemplary embodiment of the present invention. Again, it should be noted that three receivers 1004, 1020, 1036 is shown as an example only, and as will be apparent to a person of ordinary skill in the art after reading the following description, other numbers of receivers can also easily be implemented according to the present invention. For example, by coupling a plurality of digital television receivers in serial with each digital television receiver for processing a unique digital television signal and a last digital television being a master receiver connected to the MPEG decoder, the signals from any number of antennas can be effectively combined according to the present invention. As shown in FIG. 10, receiver unit 1004 is the master receiver unit being coupled to an MPEG decoder 1052. Additionally, the diversity combine receiver 1000 also includes a central controller 1050 for switching the mode of each of the receivers 1004, 1020, 1036 in the diversity combine receiver 400.

Figure 11:
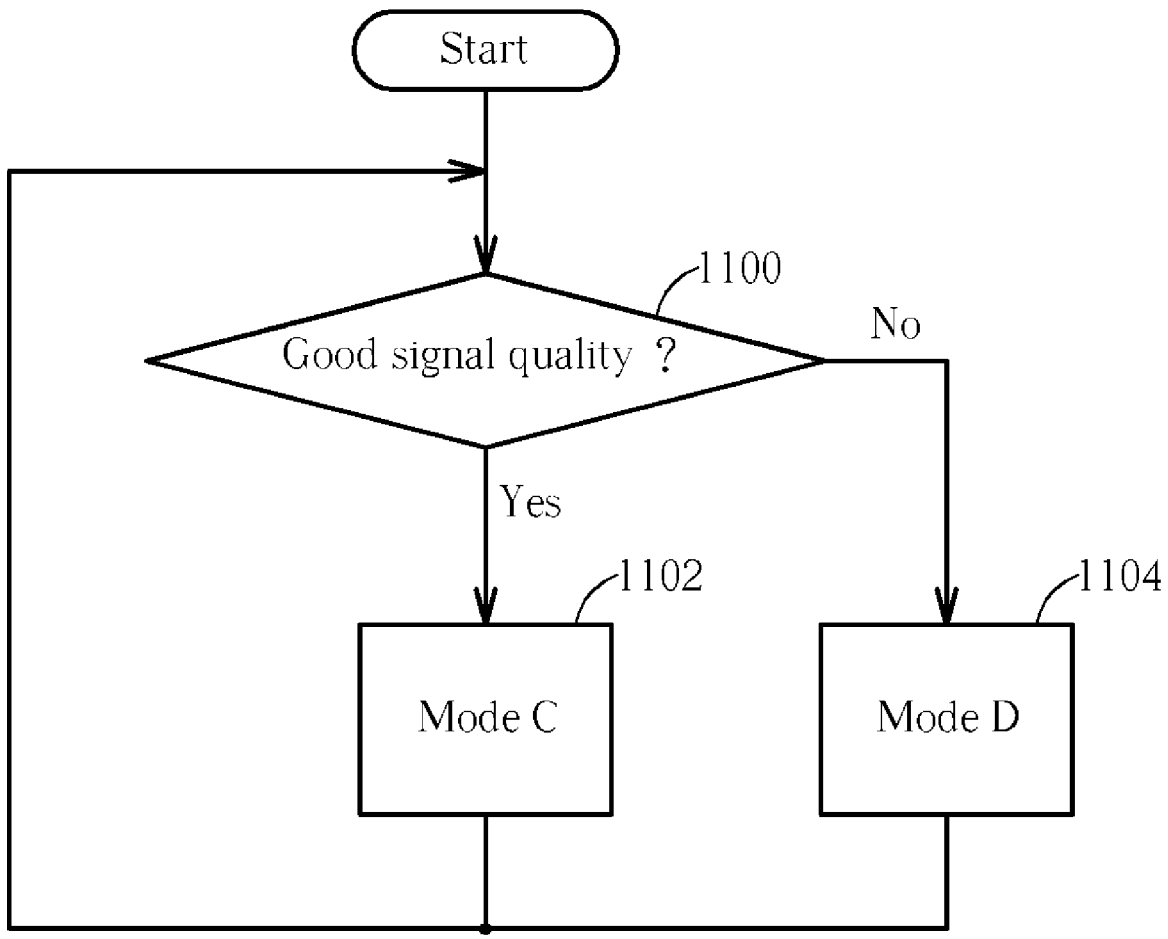
FIG. 11 shows a flowchart describing the operation of the central controller of FIG. 10 for controlling the master receiver unit according to an exemplary embodiment of the present invention.

FIG. 11 shows a flowchart describing the operation of the central controller 1050 for controlling the master receiver unit 1004 according to an exemplary embodiment of the present invention. Provided that substantially the same result is achieved, the steps of the flowchart in FIG. 11 need not be in the exact order shown and need not be contiguous, that is, other steps can be intermediate. In FIG. 11, setting the mode of the master receiver unit 1004 is performed according to a signal quality indicator Q1 outputted by the master receiver unit 1004 and includes the following steps:

Step 1100: Monitor the signal quality Q1 of the master receiver 1004. If the signal quality Q1 is sufficient (i.e., greater than a predetermined threshold), proceed to step 1102; otherwise, proceed to step 1104.

Step 1102: Set the operating mode of the master receiver 1004 to Mode C (Final combine mode using internal synchronization clock).

Step 1104: Set the operating mode of the master receiver 1004 to Mode D (Final combine mode using bypass synchronization clock.).

In this way, the demodulator 304 of the master receiver 1004 always ensures that the smooth buffer 1012 receives a high quality and accurate synchronization clock reference signal. For example, if the signal quality of the signal received from the antenna 1002 coupled to the master receiver 1004 is of a sufficient quality, the synchronization clock from the demodulator of the master receiver 1004 is directly used (Mode C). On the other hand, if the signal quality of the signal received from the antenna 1002 coupled to the master receiver 1004 is not of sufficient quality, the synchronization clock from passed from a previous receiver unit is utilized (Mode D). Therefore, the smooth buffer 310 will not have encounter buffer overflow problems, and the transport stream (TS) packet output rate to the MPEG decoder 1052 will be uniform.

Figure 12:
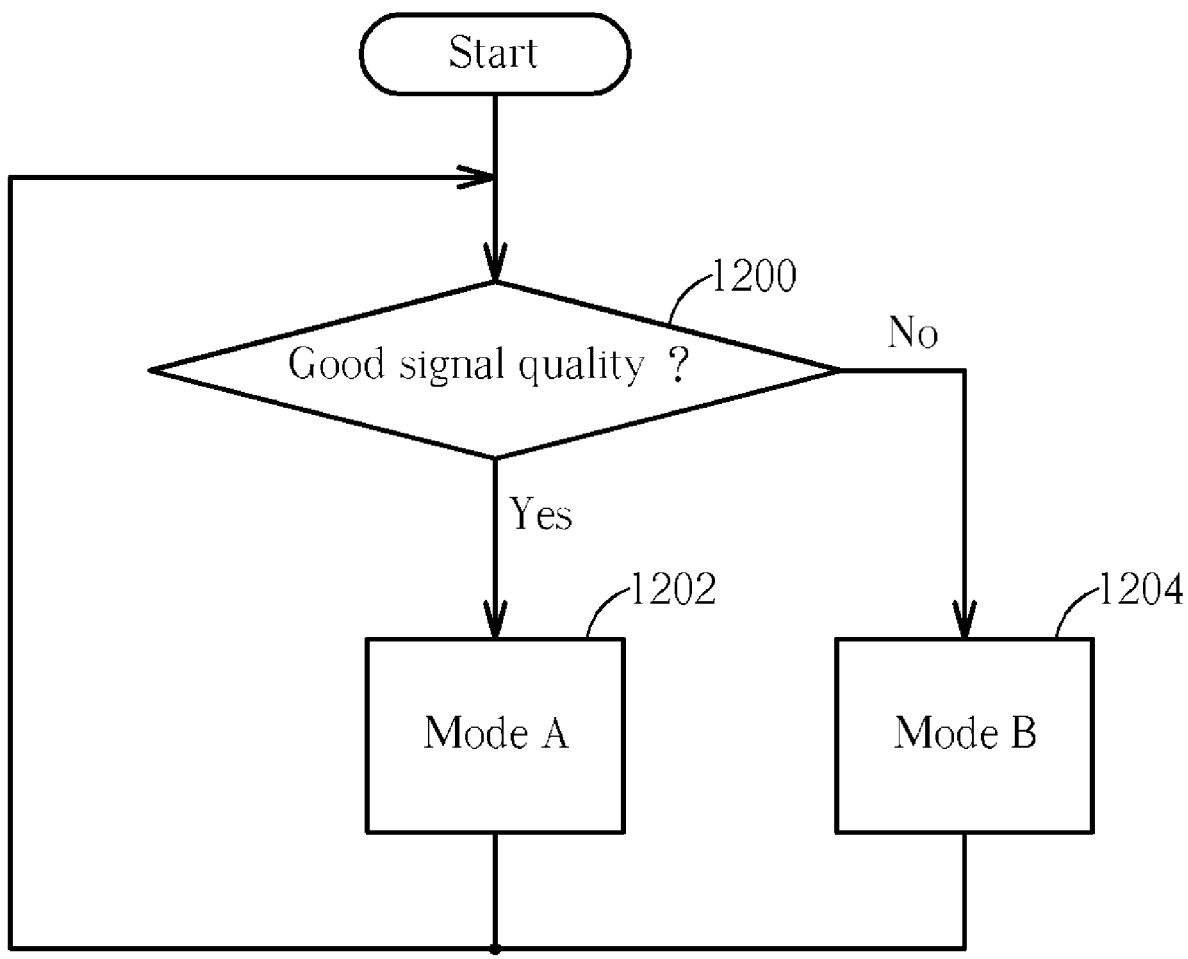
FIG. 12 shows a flowchart describing the operation of the central controller of FIG. 10 for controlling the slave receiver units according to an exemplary embodiment of the present invention.

FIG. 12 shows a flowchart describing the operation of the central controller 1050 for controlling the slave receiver units 1020, 1036 according to an exemplary embodiment of the present invention. Provided that substantially the same result is achieved, the steps of the flowchart in FIG. 12 need not be in the exact order shown and need not be contiguous, that is, other steps can be intermediate. In FIG. 12, setting the mode of the slave receiver units 1020,1036 is performed according to a signal quality indicator Q2, Q3 outputted by the slave receiver units 1020,1036, respectively, and includes the following steps:

Step 1200: Monitor the signal quality Q2, Q3 of each of the slave receiver units 1020,1036. If the signal quality Q2, Q3 for a particular slave receiver 1020,1036 is sufficient (i.e., greater than another predetermined threshold), proceed to step 1202; otherwise, proceed to step 1204.

Step 1202: Set the operating mode of the particular slave receiver 1020,1036 to Mode A (Combine mode using internal synchronization clock).

Step 1204: Set the operating mode of the particular slave receiver 1020,1036 to Mode B (Combine mode using bypass synchronization clock).

In this way, only slave units with good signal quality will pass forward high quality and accurate synchronization clock reference signals. Therefore, if the master receiver 1004 does not have sufficient signal quality to generate the synchronization clock directly, the received bypass synchronization clock from the slave units will be of good quality and will be used instead (see FIG. 11).

Figure 13:
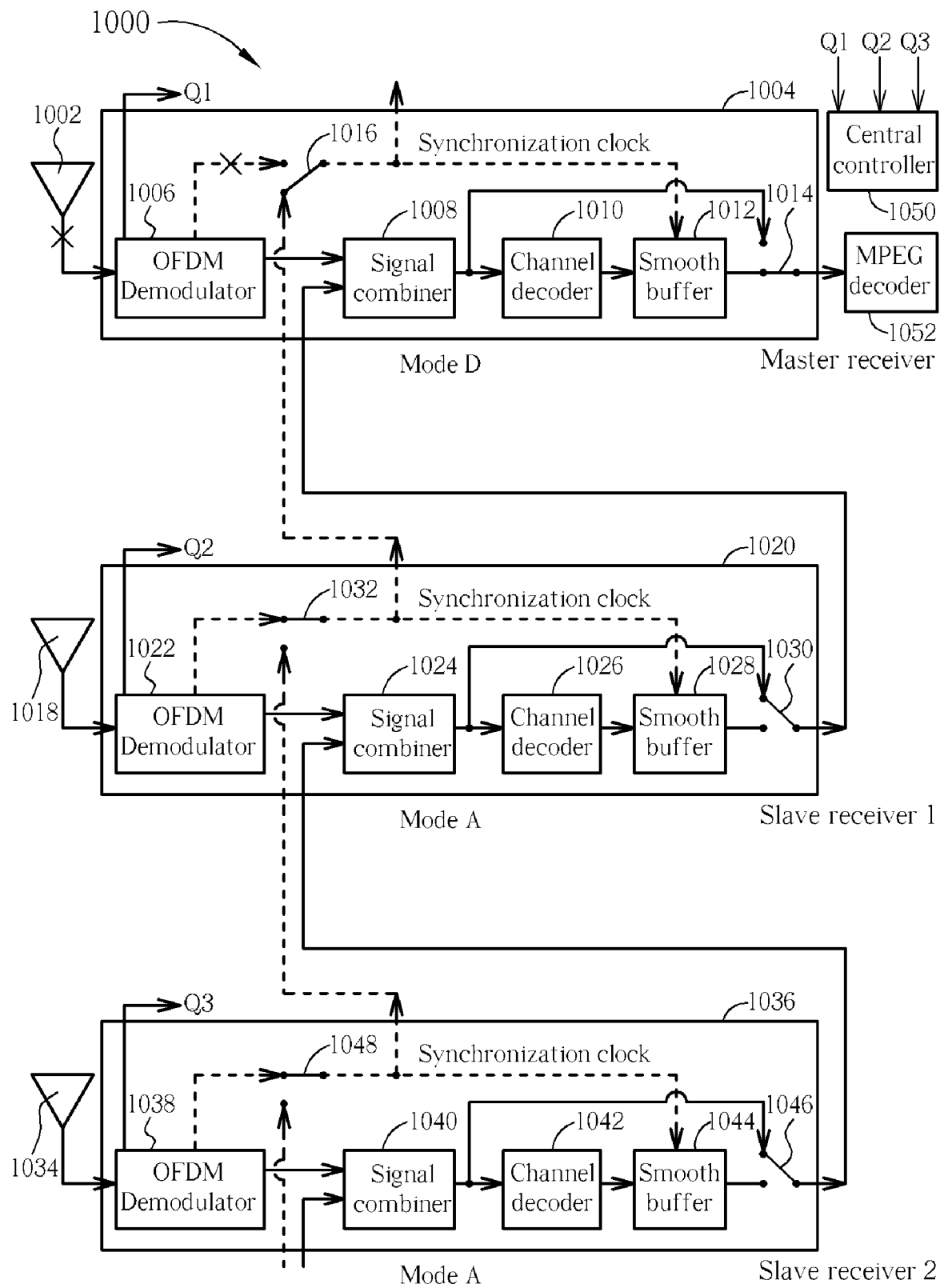
FIG. 13 shows the diversity combine receiver of FIG. 10 when the master receiver has poor signal quality while the two slave receivers both have good signal quality.
Figure 14:
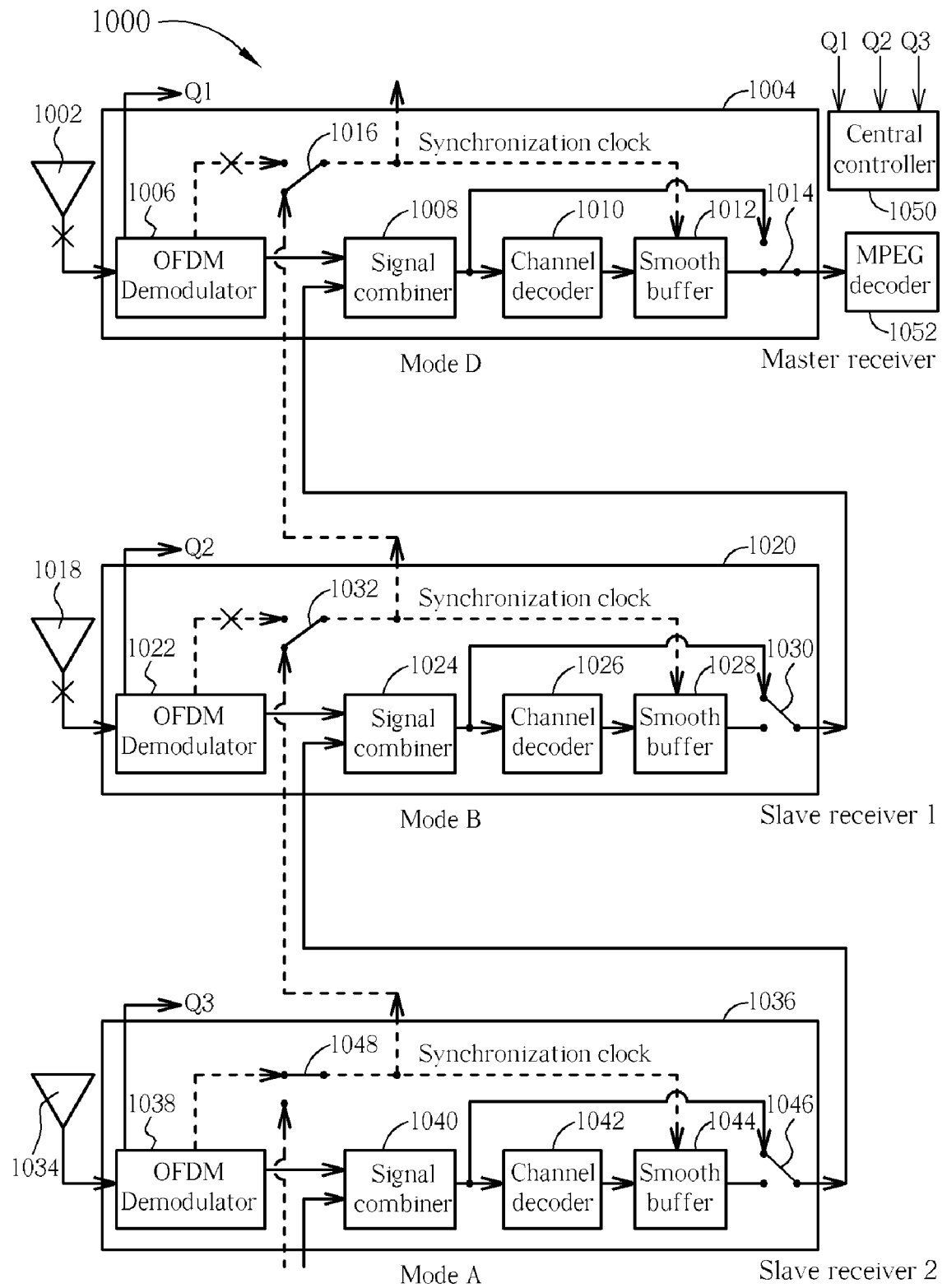
FIG. 14 shows the diversity combine receiver of FIG. 10 when the master receiver and the first slave receiver both have poor signal quality while the second slave receiver has good signal quality.

FIG. 13 and FIG. 14 show additional examples of the second diversity combine receiver 1000 according to the present invention when the three receiver units 1004, 1020, 1036 are receiving various signal qualities. In particular, FIG. 13 shows the first diversity combine receiver 1000 when the master receiver 1004 has poor signal quality while the two slave receivers 1020, 1036 both have good signal quality. In this situation, according to the algorithms of FIG. 111 and FIG. 12, the central controller 1050 switches the master receiver 1004 into Mode D, the first and second slave receivers 1020, 1036 into Mode A. FIG. 14 shows the first diversity combine receiver 1000 when the master receiver 1004 and the first slave receiver 1020 both have poor signal quality while the second slave receiver 1036 has good signal quality. In this situation, according to the algorithms of FIG. 11 and FIG. 12, the central controller 1050 switches the master receiver 1004 into Mode D, the first slave receiver 1020 into Mode B, and the second slave receiver 1036 into Mode A.

The present invention provides a method of generating a smoothed transport stream to an MPEG decoder for a diversity combine digital television receiver. By generating a plurality of synchronization clocks and demodulated signals according to a plurality of digital television signals received from a plurality of antennas; monitoring a signal quality associated with each of the digital television signals; combining at least demodulated signals having a signal quality being greater than a predetermined threshold to thereby form a combined signal; generating transport stream packets according to the combined signal; selecting a synchronization signal corresponding to a digital television signal having a signal quality being greater than a second predetermined threshold as a selected synchronization signal; and generating a smoothed transport stream having packets being uniformly spaced according to the transport stream packets and the selected synchronization signal, a flexible diversity combine digital television receiver architecture is provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital television receiver comprising:
a demodulator being coupled to an antenna for generating a synchronization clock and a demodulated signal according to a digital television signal received from the antenna;
a first switch having one end being coupled to a bypass signal from another receiver for selectively coupling the bypass signal to a first node or a second node;
a signal combiner being coupled to the demodulator and the first node for combining the demodulated signal and the bypass signal when the first switch is coupling the bypass signal to the first node, and for passing the demodulated signal when the first switch is not coupling the bypass signal to the first node to thereby form a combined signal;
a channel decoder being coupled to the signal combiner for generating transport stream packets according to the combined signal;
a smooth buffer being coupled to the channel decoder and the demodulator for generating a smoothed transport stream having packets being uniformly spaced according to the transport stream packets generated by the channel decoder and the synchronization clock generated by the demodulator; and
a second switch being coupled to the signal combiner, the smooth buffer, and the first switch for selectively coupling the combined signal, the smoothed transport stream, or the bypass signal to an output terminal of the digital television receiver.

2. The digital television receiver of claim 1, wherein the demodulator is further for generating a signal quality indicator corresponding to a signal quality of the digital television signal received from the antenna.

3. The digital television receiver of claim 1, wherein the digital television receiver is for operating in a bypass mode when the digital television signal received from the antenna is less than a predetermined threshold, the bypass mode having the first switch couple the bypass signal to the second node, and the second switch couple the bypass signal to the output terminal of the digital television receiver.

4. The digital television receiver of claim 1, wherein the digital television receiver is for operating in a combine mode when the digital television signal received from the antenna is greater than a predetermined threshold, the combine mode having the first switch couple the bypass signal to the first node, and the second switch couple the combined signal to the output terminal of the digital television receiver.

5. The digital television receiver of claim 1, wherein the digital television receiver is for operating in a final combine mode when the digital television receiver is a closest receiver to a master receiver or the master receiver that is receiving a digital television signal being greater than a predetermined threshold, the final combine mode having the first switch couple the bypass signal to the first node, and the second switch couple the smoothed transport stream to the output terminal of the digital television receiver.

6. A digital television receiver comprising:
a demodulator being coupled to an antenna for generating a synchronization clock and a demodulated signal according to a digital television signal received from the antenna;
a first switch for selectively coupling the synchronization clock being generated by the demodulator in a first node or a bypass synchronization clock from another receiver to a second node;
a signal combiner being coupled to the demodulator and an output signal from the other receiver for combining the demodulated signal and the output signal from the other receiver to the first node to thereby form a combined signal;
a channel decoder being coupled to the signal combiner for generating transport stream packets according to the combined signal;
a smooth buffer being coupled to the channel decoder and the demodulator for generating a smoothed transport stream having packets being uniformly spaced according to the transport stream packets generated by the channel decoder and the synchronization clock; and
a second switch being coupled to the signal combiner and the smooth buffer for selectively coupling the combined signal or the smoothed transport stream to an output terminal of the digital television receiver.

7. The digital television receiver of claim 6, wherein the demodulator is further for generating a signal quality indicator corresponding to a signal quality of the digital television signal received from the antenna.

8. The digital television receiver of claim 6, wherein the digital television receiver is for operating in a combine mode when the digital television receiver is not a master receiver and the digital television signal received from the antenna is greater than a predetermined threshold, the combine mode having the first switch couple the synchronization clock being generated by the demodulator to the first node, and the second switch couple the combined signal to the output terminal of the digital television receiver.

9. The digital television receiver of claim 6, wherein the digital television receiver is for operating in a bypass combine mode when the digital television receiver is not a master receiver and the digital television signal received from the antenna is less than a predetermined threshold, the bypass combine mode having the first switch couple the bypass synchronization clock to the second node, and the second switch couple the combined signal to the output terminal of the digital television receiver.

10. The digital television receiver of claim 6, wherein the digital television receiver is for operating in a final combine mode when the digital television receiver is a master receiver and the digital television signal received from the antenna is greater than a predetermined threshold, the final combine mode having the first switch couple the synchronization clock being generated by the demodulator to the first node, and the second switch couple the smoothed transport stream to the output terminal of the digital television receiver.

11. The digital television receiver of claim 6, wherein the digital television receiver is for operating in a bypass final combine mode when the digital television receiver is a master receiver and the digital television signal received from the antenna is less than a predetermined threshold, the bypass final combine mode having the first switch couple the bypass synchronization clock to the second node, and the second switch couple the smoothed transport stream to the output terminal of the digital television receiver.

12. A method of generating a smoothed transport stream to an MPEG decoder for a diversity combine digital television receiver, the method comprising:
generating a plurality of synchronization clocks and demodulated signals according to a plurality of digital television signals received from a plurality of antennas;
monitoring a signal quality associated with each of the digital television signals;
combining at least demodulated signals having a signal quality being greater than a predetermined threshold to thereby form a combined signal;
generating transport stream packets according to the combined signal;
selecting a synchronization signal corresponding to a digital television signal having a signal quality being greater than a second predetermined threshold as a selected synchronization signal; and
generating a smoothed transport stream having packets being uniformly spaced according to the transport stream packets and the selected synchronization signal.

13. The method of claim 12, further comprising coupling a plurality of digital television receivers in serial, each digital television receiver for processing a unique digital television signal, and a last digital television being a master receiver connected to the MPEG decoder.

14. The method of claim 12, further comprising if a particular digital television receiver is receiving a digital television signal being less than a third predetermined threshold, operating the particular digital television receiver in a bypass mode by coupling a bypass signal from a previous digital television receiver to a next digital television receiver.

15. The method of claim 12, further comprising if a particular digital television receiver is receiving a digital television signal being greater than a third predetermined threshold, operating the particular digital television receiver in a combine mode by combining a demodulated signal of the particular receiver with a bypass signal from a previous digital television receiver and coupling a resulting combined signal to a next digital television receiver.

16. The method of claim 12, further comprising if a particular digital television receiver is receiving a digital television signal being greater than a third predetermined threshold and is a closest receiver to a master receiver or is the master receiver, operating the particular digital television receiver in a final combine mode by combining a demodulated signal of the particular receiver with a bypass signal from a previous digital television receiver, generating transport stream packets according to the combined signal, and generating the smoothed transport stream according to a synchronization signal decoded by the particular digital television receiver.

17. The method of claim 12, further comprising if a particular digital television receiver is not a master receiver and is receiving a digital television signal being greater than a third predetermined threshold, passing a synchronization signal decoded by the particular digital television signal to a next digital television receiver, and outputting a combined signal generated by the particular digital television signal.

18. The method of claim 12, further comprising if a particular digital television receiver is not a master receiver and is receiving a digital television signal being less than a third predetermined threshold, passing a synchronization signal received from a previous digital television receiver to a next digital television receiver, and outputting a combined signal generated by the particular digital television signal.

19. The method of claim 12, further comprising if a particular digital television receiver is a master receiver and is receiving a digital television signal being greater than a third predetermined threshold, passing a synchronization signal decoded by the particular digital television receiver to a smooth buffer of the particular digital television receiver to thereby generate the smoothed transport stream according synchronization signal decoded by the particular digital television.

20. The method of claim 12, further comprising if a particular digital television receiver is a master receiver and is receiving a digital television signal being less than a third predetermined threshold, passing a synchronization signal received from a previous digital television receiver to a smooth buffer of the particular digital television receiver to thereby generate the smoothed transport stream according synchronization signal received from the previous digital television receiver.

* * * * *